United States Patent
Zhu et al.

(10) Patent No.: US 10,848,004 B2
(45) Date of Patent: Nov. 24, 2020

(54) RESONANCE CIRCUIT, WIRELESS POWER SUPPLY TRANSMITTER, SWITCH CIRCUIT AND FULL-BRIDGE TRANSMITTING CIRCUIT

(71) Applicant: ZONECHARGE WIRELESS POWER TECHNOLOGY CO., LTD., Shandong (CN)

(72) Inventors: Sizhong Zhu, Shandong (CN); Baohua Xu, Shandong (CN); Zhi He, Shandong (CN); Xiangdong Xu, Shandong (CN)

(73) Assignee: ZONECHARGE (SHENZHEN) WIRELESS POWER TECHNOLOGY CO, LTD., Guangdong (CN)

( * ) Notice: Subject to any disclaimer, the term of this patent is extended or adjusted under 35 U.S.C. 154(b) by 91 days.

(21) Appl. No.: 16/302,622

(22) PCT Filed: Oct. 18, 2016

(86) PCT No.: PCT/CN2016/102444
§ 371 (c)(1),
(2) Date: Nov. 17, 2018

(87) PCT Pub. No.: WO2017/206420
PCT Pub. Date: Dec. 7, 2017

(65) Prior Publication Data
US 2019/0222067 A1   Jul. 18, 2019

(30) Foreign Application Priority Data

Jun. 1, 2016 (CN) .......................... 2016 1 0381959
Jun. 1, 2016 (CN) .......................... 2016 1 0382109

(Continued)

(51) Int. Cl.
*H02J 50/12* (2016.01)
*H02J 50/40* (2016.01)

(52) U.S. Cl.
CPC .............. *H02J 50/12* (2016.02); *H02J 50/40* (2016.02)

(58) Field of Classification Search
CPC ................................. H02J 50/12; H02J 50/40
See application file for complete search history.

(56) References Cited

U.S. PATENT DOCUMENTS

2010/0109443 A1*   5/2010  Cook ....................... H02J 50/12
                                                                307/104
2010/0187912 A1*   7/2010  Kitamura ................ H02J 50/12
                                                                307/104

(Continued)

FOREIGN PATENT DOCUMENTS

CN        102017363 A       4/2011
CN        102113195 A       6/2011

(Continued)

OTHER PUBLICATIONS

International Search Report for PCT/CN2016/102444 dated Mar. 6, 2017, ISA/CN.

(Continued)

*Primary Examiner* — Jared Fureman
*Assistant Examiner* — Michael J Warmflash
(74) *Attorney, Agent, or Firm* — Yue (Robert) Xu; Apex Attorneys at Law, LLP

(57) ABSTRACT

A single-control series resonance circuit, a wireless power supply transmitter, a switch circuit and a full-bridge transmitting circuit, wherein the single-control series resonance circuit comprises: a switching tube, a resonance transmitting coil and a resonance capacitor. One end of the resonance transmitting coil is connected to one end of the resonance (Continued)

capacitor, the other end of the resonance transmitting coil is connected to the positive pole of a power supply, and the other end of the resonance capacitor is grounded. A first end of the switching tube is connected to one end of the resonance capacitor, and a second end of the switching tube is connected to the other end of the resonance capacitor. The circuit of the single-control series resonance circuit is very simple, the costs are low, and the EMC characteristics are good.

6 Claims, 15 Drawing Sheets

(30) Foreign Application Priority Data

| | | |
|---|---|---|
| Jun. 1, 2016 | (CN) | 2016 2 0524022 U |
| Jun. 1, 2016 | (CN) | 2016 2 0524130 U |
| Jun. 12, 2016 | (CN) | 2016 1 0407979 |
| Jun. 12, 2016 | (CN) | 2016 2 0561642 U |
| Aug. 3, 2016 | (CN) | 2016 1 0626845 |
| Aug. 3, 2016 | (CN) | 2016 2 0836693 U |

(56) References Cited

U.S. PATENT DOCUMENTS

| | | | |
|---|---|---|---|
| 2011/0046438 A1* | 2/2011 | Iwaisako | A61B 1/00029 |
| | | | 600/101 |
| 2013/0154384 A1 | 6/2013 | Nakamura | |
| 2015/0188365 A1* | 7/2015 | Wang | H01Q 7/00 |
| | | | 307/104 |
| 2015/0333537 A1 | 11/2015 | Uchida | |
| 2017/0093219 A1 | 3/2017 | Su | |

FOREIGN PATENT DOCUMENTS

| | | | |
|---|---|---|---|
| CN | 103633749 A | | 3/2014 |
| CN | 103647468 A | * | 3/2014 |
| CN | 103647468 A | | 3/2014 |
| CN | 203590068 U | | 5/2014 |
| CN | 104079146 A | * | 10/2014 |
| CN | 104079146 A | | 10/2014 |
| CN | 104753184 A | | 7/2015 |
| CN | 105027384 A | | 11/2015 |
| CN | 105119391 A | | 12/2015 |
| CN | 105939064 A | | 9/2016 |
| CN | 105958665 A | | 9/2016 |
| CN | 106026418 A | | 10/2016 |
| CN | 106026422 A | | 10/2016 |
| CN | 205681189 U | | 11/2016 |
| CN | 205681190 U | | 11/2016 |
| CN | 205829318 U | | 12/2016 |
| CN | 206004420 U | | 3/2017 |

OTHER PUBLICATIONS

SIPO First Office Action corresponding to Application No. 201610381959.3; dated Jul. 5, 2017.

SIPO First Office Action corresponding to Application No. 201610382109.5; dated Jul. 5, 2017.

SIPO First Office Action corresponding to Application No. 201610407979.3; dated Jul. 5, 2017.

SIPO First Office Action corresponding to Application No. 201610626845.0; dated Jul. 5, 2017.

* cited by examiner

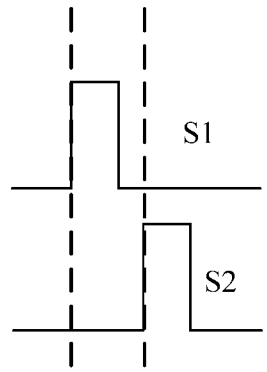
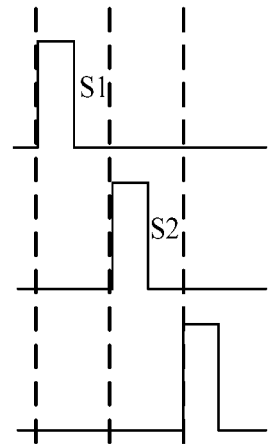
Figure 6(a)　　　　　　Figure 6(b)
Figure 7
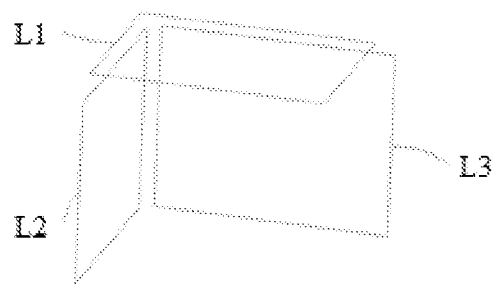
Figure 8

US 10,848,004 B2

RESONANCE CIRCUIT, WIRELESS POWER SUPPLY TRANSMITTER, SWITCH CIRCUIT AND FULL-BRIDGE TRANSMITTING CIRCUIT

This application is the national phase of International Application No. PCT/CN2016/102444, titled "RESONANCE CIRCUIT, WIRELESS POWER SUPPLY TRANSMITTER, SWITCH CIRCUIT AND FULL-BRIDGE TRANSMITTING CIRCUIT", filed on Oct. 18, 2016, which is incorporated herein by reference in its entirety.

FIELD

This application claims the priority to Chinese Patent Application No. 201610382109.5, titled "COMPLEMENTARY WIRELESS POWER TRANSMITTER", filed on Jun. 1, 2016 with the Chinese Patent Office, which is incorporated herein by reference in its entirety.

This application claims the priority to Chinese Patent Application No. 201620524130.x, titled "COMPLEMENTARY WIRELESS POWER TRANSMITTER", filed on Jun. 1, 2016 with the Chinese Patent Office, which is incorporated herein by reference in its entirety.

This application claims the priority to Chinese Patent Application No. 201610381959.3, titled "SINGLE-CONTROL SERIES RESONANCE CIRCUIT", filed on Jun. 1, 2016 with the Chinese Patent Office, which is incorporated herein by reference in its entirety.

This application claims the priority to Chinese Patent Application No. 201620524022.2, titled "SINGLE CONTROL SERIES RESONANCE CIRCUIT", filed on Jun. 1, 2016 with the Chinese Patent Office, which is incorporated herein by reference in its entirety.

This application claims the priority to Chinese Patent Application No. 201610407979.3, titled "FULL-BRIDGE TRANSMITTING CIRCUIT DRIVEN BY SINGLE POWER SOURCE", filed on Jun. 12, 2016 with the Chinese Patent Office, which is incorporated herein by reference in its entirety.

This application claims the priority to Chinese Patent Application No. 201620561642.3, titled "FULL-BRIDGE TRANSMITTING CIRCUIT DRIVEN BY SINGLE POWER SOURCE", filed on Jun. 12, 2016 with the Chinese Patent Office, which is incorporated herein by reference in its entirety.

This application claims the priority to Chinese Patent Application No. 201610626845.0, titled "SWITCH CIRCUIT AND MULTI-CONTROL SERIES RESONANCE CIRCUIT", filed on Aug. 3, 2016 with the Chinese Patent Office, which is incorporated herein by reference in its entirety.

This application claims the priority to Chinese Patent Application No. 201620836693.2, titled "SWITCH CIRCUIT AND MULTI-CONTROL SERIES RESONANCE CIRCUIT", filed on Aug. 3, 2016 with the Chinese Patent Office, which is incorporated herein by reference in its entirety.

BACKGROUND

According to wireless power supply, electrical energy of a power source is converted into energy which is wirelessly transmitted via a coil through electromagnetic effect, and this energy is converted back to electrical energy at a receiving terminal for powering an electric appliance.

A traditional wireless power supply system includes a magnetic resonance wireless power supply system. The magnetic resonance wireless power supply system includes a wireless power transmitter and a receiving circuit. The wireless power transmitter includes a resonance circuit. The resonance circuit includes a power supply circuit, a resonance transmitting coil and a capacitor. Electrical energy in the power supply circuit is converted into magnetic field energy through the resonance transmitting coil. The receiving circuit converts the received magnetic field energy into electrical energy for powering a load. In the conventional technology, the resonance circuit is complicated, and has a poor EMC (Electro Magnetic Compatibility) characteristic. The characteristic of the resonance circuit directly influences power and efficiency of the wireless power transmitter in transmitting the magnetic energy.

Therefore, there is an urgent need for a resonance circuit which has a simple circuit and a good EMC characteristic.

SUMMARY

In view of the above, a resonance circuit, a wireless power transmitter, a switch circuit, and a full-bridge transmitting circuit are provided according to the present disclosure, so as to overcome the problem that a single-control series resonance circuit in conventional technology cannot simultaneously meet requirements of a simple circuit and a good EMC characteristic.

In order to achieve the above object, following technical solutions are provided according to embodiments of the present disclosure.

A single-control series resonance circuit applied for wireless power supply is provided. The single-control series resonance circuit includes a switch transistor, a resonance transmitting coil, and a resonance capacitor.

One terminal of the resonance transmitting coil is connected to one terminal of the resonance capacitor, another terminal of the resonance transmitting coil is connected to a positive pole of a power source, another terminal of the resonance capacitor is grounded, a first terminal of the switch transistor is connected to the one terminal of the resonance capacitor, and a second terminal of the switch transistor is connected to the other terminal of the resonance capacitor.

A complementary wireless power transmitter is provided, which includes: a signal source and N resonance transmitters.

The signal source includes N signal output terminals, where the signal source generates N signals respectively corresponding to the N signal output terminals, the N signals have a same frequency, a phase difference of the N signals is 360°/N, and N is a positive integer greater than or equal to 2 and less than or equal to 360.

An input terminal of each of the N resonance transmitters is connected to one of the N signal output terminals of the signal source, each of the N resonance transmitters includes a resonance circuit, the resonance circuit includes a resonance transmitting coil, a resonance capacitor, and a switch transistor, and an angle between planes at which the N resonance transmitting coils are located is a preset angle.

One terminal of the resonance transmitting coil is connected to one terminal of the resonance capacitor, another terminal of the resonance transmitting coil is connected to a positive pole of a power source, and another terminal of the resonance capacitor is grounded, a control terminal of the switch transistor is connected to one of the N signal output terminals of the signal source, a first terminal of the switch transistor is connected to the one terminal of the resonance capacitor, and a second terminal of the switch transistor is connected to the other terminal of the resonance capacitor.

A switch circuit applied to an LC series resonant ring is provided. The LC series resonant ring includes a resonance transmitting coil and a resonance capacitor, one terminal of the resonance transmitting coil is connected to one terminal of the resonance capacitor, another terminal of the resonance transmitting coil is connected to a positive pole of a power source, another terminal of the resonance capacitor is grounded.

The switch circuit includes N switch transistors connected in parallel, first terminals of the N switch transistors are connected to the one terminal of the resonance capacitor, second terminals of the N switch transistors is connected to the other terminal of the resonance capacitor, and N is a positive integer greater than or equal to 2.

Only one of the N switch transistors is turned on at a time instant, a sum of turn-on frequencies of the N switch transistors equals to a resonant frequency of the LC series resonant ring, and the turn-on frequency is a frequency at which the switch transistor is turned on.

A multi-control series resonance circuit is provided. The multi-control series resonance circuit includes the above switch circuit and an LC series resonant ring, where the LC series resonant ring includes a resonance transmitting coil and a resonance capacitor, one terminal of the resonance transmitting coil is connected to one terminal of the resonance capacitor, another terminal of the resonance transmitting coil is connected to a positive pole of a power source, and another terminal of the resonance capacitor is grounded.

A full-bridge transmitting circuit driven by a single power source applied for wireless power supply is provided. The full-bridge transmitting circuit includes three resonant ring circuits, two switch transistors, and a driving power source. The three resonant ring circuits are a first resonant ring circuits, a second resonant ring circuit, and a third resonant ring circuit. The two switch transistors are a first switch transistor and a second switch transistor.

The first switch transistor is connected in parallel with a resonance capacitor of the first resonant ring circuit, the second switch transistor is connected in parallel with a resonance capacitor of the third resonant ring circuit, and the second resonant ring circuit is connected between a midpoint of the first resonant ring circuit and a midpoint of the third resonant ring circuit.

The first resonant ring circuit and the first switch transistor form a first single-control series resonance circuit, and the third resonant ring circuit and the second switch transistor form a second single-control series resonance circuit.

Each of the first single-control series resonance circuit and the second single-control series resonance circuit includes a switch transistor, a resonance transmitting coil, and a resonance capacitor.

One terminal of the resonance transmitting coil is connected to one terminal of the resonance capacitor, another terminal of the resonance transmitting coil is connected to a positive pole of a power source, another terminal of the resonance capacitor is grounded, a first terminal of the switch transistor is connected to the one terminal of the resonance capacitor, and a second terminal of the switch transistor is connected to the other terminal of the resonance capacitor.

As can be seen from the above technical solutions, as compared with the conventional technology, the single-control series resonance circuit according to the embodiments of the present disclosure is a simple circuit formed by three components. The circuit is simple and has a low cost. The resonance capacitor has two functions. A primary function of the resonance capacitor is to form the resonant ring in cooperation with the resonance transmitting coil. A secondary function of the resonance capacitor is to absorb a large pulse current at two terminals of the switch transistor by being connected between the two terminals of the switch transistor, so as to prevent damage to the switch transistor. The resonance transmitting coil also has two functions. One is to form the resonant ring in cooperation with the resonance capacitor, and the other is to serve as a resonance transmitting coil for transmitting magnetic energy. In response to the control terminal of the switch transistor being at a high level, the switch transistor is turned on. In this case, the resonance capacitor is short-circuited. Due to a characteristic of the resonance transmitting coil, a voltage across the resonance transmitting coil cannot be abruptly changed. Therefore, energy is stored in the resonance transmitting coil. In response to the control terminal of the switch transistor being at a low level, the switch transistor is turned off, the energy in the resonance transmitting coil is released for charging the resonance capacitor. In this process, most of the energy in the resonance transmitting coil is converted into magnetic energy and transmitted outward, and a small part of the energy is stored in the resonance capacitor. The switch transistor continuously repeats the above process, and the resonance transmitting coil continuously transmits the magnetic energy outward. The magnetic energy transmitted by the resonance transmitting coil has a unique frequency, and thus has a stable waveform and few harmonics. Therefore, a good EMC characteristic and a large output power can be achieved.

Further, in the single-control series resonance circuit, only connection between the control terminal of the switch transistor and the signal output terminal of the signal source is required, that is, the single-control series resonance circuit can be powered by a single power source. Therefore, the single-control series resonance circuit is simple to control.

BRIEF DESCRIPTION OF THE DRAWINGS

The drawings to be used in the description of the embodiments of the application or the conventional technology will be described briefly as follows, so that the technical solutions according to the embodiments of the present application or according to the conventional technology will become clearer. It is apparent that the drawings in the following description only illustrate some embodiments of the present application. For those skilled in the art, other drawings may be obtained according to these drawings without any creative work.

FIG. 1 (b) is a half-bridge circuit in the conventional technology;

FIG. 1 (c) is a full-bridge circuit in the conventional technology;

FIG. 6 (a) is a waveform diagram of two signals;

FIG. 6 (b) is a waveform diagram of three signals;

FIG. 7 is a schematic diagram showing relative positions and distribution of a resonance transmitting coil L1 and a resonance transmitting coil L2;

FIG. 8 is a schematic diagram showing relative positions and distribution of a resonance transmitting coil L1, a resonance transmitting coil L2, and a resonance transmitting coil L3;

DETAILED DESCRIPTION

For reference and clarity, the illustrations, acronyms or abbreviations of technical terms used hereafter are summarized as follows:

IGBT is the abbreviation for Insulated Gate Bipolar Transistor,

MOSFET is the abbreviation for Metal-Oxide-Semiconductor Field-Effect Transistor, EMC is the abbreviation for Electro Magnetic Compatibility, and PWM is the abbreviation for Pulse Width Modulation.

Technical solutions according to embodiments of the present disclosure are described clearly and completely hereinafter in conjunction with drawings used in the embodiments of the present disclosure. Apparently, the described embodiments are only some embodiments of the present disclosure rather than all the embodiments. Any other embodiments obtained by those skilled in the art based on the embodiments of the present disclosure without any creative work fall in the scope of protection of the present disclosure.

Figure 1A:
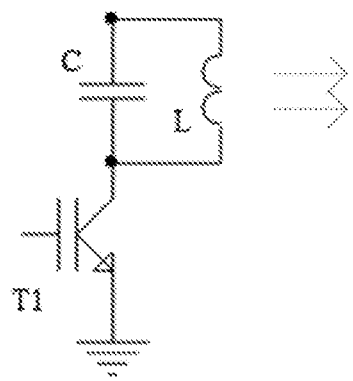
FIG. 1 (a) is a single-transistor flyback circuit in the conventional technology.
Figure 1B:
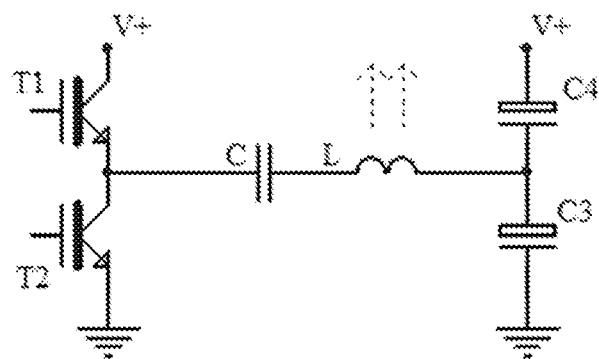
Figure 1C:
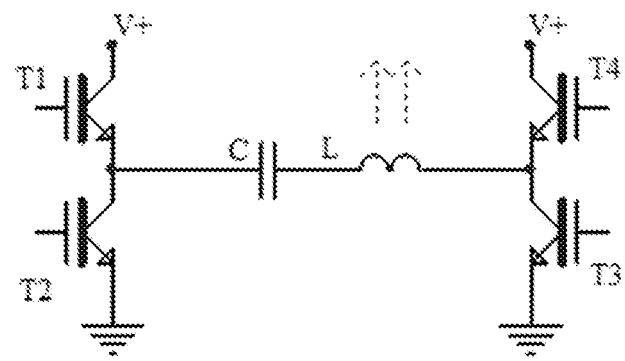

A conventional resonance circuit includes a single-transistor flyback circuit, a half-bridge circuit, and a full-bridge circuit. As shown in FIG. 1(a), in the single-transistor flyback circuit, a resonance capacitor C and a resonance transmitting coil L of the resonant ring are connected in parallel. One terminal of the resonant ring is connected to a positive pole V+ of a power source, the other terminal of the resonant ring is connected to the collector of a switch transistor T1, and the emitter of the switch transistor T1 is grounded. Reference is made to FIG. 1(b), which shows a half-bridge circuit. In the half-bridge circuit, a resonance capacitor C and a resonance transmitting coil L in a resonant ring may be connected in series or in parallel. The half-bridge circuit has two bridge arms. The left bridge arm is formed by an upper switch transistor T1 and a lower transistor T2 which are connected in series. The right bridge arm is formed by an upper resonance capacitor C3 and a lower resonance capacitor C4 connected in series. One terminal of the resonant ring is connected to a midpoint of the left bridge arm, and the other terminal of the resonant ring is connected to a midpoint of the right bridge arm. Circuits of the left bridge arm and the right bridge arm are interchangeable. Reference is made to FIG. 1(c), which shows a full-bridge circuit. In the full-bridge circuit, it is allowable that a resonance capacitor C and a resonance transmitting coil L in a resonant ring are connected in series or in parallel. The full-bridge circuit has two bridge arms. The left bridge arm is formed by an upper switch transistor T1 and a lower switch transistor T2 which are connected in series. The right bridge arm is formed by an upper switch transistor T3 and a lower switch transistor T4 which are connected in series. One terminal of the resonant ring is connected to a midpoint of the left bridge arm, and the other terminal of the resonant ring is connected to a midpoint of the right bridge arm.

In the process of implementing the present disclosure, applicant has following discoveries. The single-transistor flyback circuit is simple, has a low cost and is easy to control, but disadvantages thereof are more prominent. Under interaction between free resonance of the resonant ring and active resonance of a single-control series resonance circuit, a complex secondary oscillation due to frequency doubling and superposition results in serious contamination to an environment power grid, and causes a poor EMC characteristic. The half-bridge circuit generally requires 2 or 3 isolated power sources, has a moderate cost, and is easy to control, but a current waveform thereof is prone to distortion when affected by a leakage current, which affects the EMC characteristic. An output power the half-bridge circuit is less than an output power of the full-bridge circuit. The full-bridge circuit is complicated, requires 4 or 5 isolated power sources for driving, has a high cost, and is difficult to control. However, the full-bridge circuit has a complete current waveform and a complete voltage waveform, and has a good EMC characteristic and a large output power.

Figure 2:
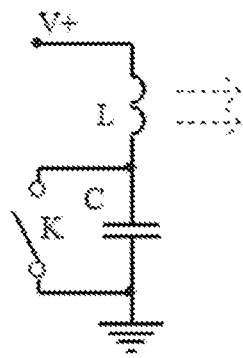
FIG. 2 is a circuit diagram of an implementation of a single-control series resonance circuit applied for wireless power supply.

Reference is made to FIG. 2, which is a circuit diagram of an implementation of a single-control series resonance circuit applied for wireless power supply. The single-control series resonance circuit includes a resonance transmitting coil L, a resonance capacitor C, and a switch transistor K.

One terminal of the resonance transmitting coil L is connected to one terminal of the resonance capacitor C, another terminal of the resonance transmitting coil L is connected to a positive pole V+ of a power source, and another terminal of the resonance capacitor C is grounded. A first terminal of the switch transistor is connected to the one terminal of the resonance capacitor, and a second terminal of the switch transistor is connected to the other terminal of the resonance capacitor.

In the embodiment of the present disclosure, the switch transistor may be an NMOSFET. In this case, the first terminal may be the drain, and correspondingly, the second terminal is the source, and a control terminal is the gate. The switch transistor may be a PMOSFET. In this case, the first terminal is the source, the second terminal is the drain, and the control terminal is the gate. The switch transistor may be an IGBT. In this case, the first terminal is the collector, and correspondingly, the second terminal is the emitter, and the control terminal is the gate.

A frequency of a signal driving the switch transistor K is consistent with an inherent free resonant frequency of a resonant ring. Namely, the frequency of the signal driving the switch transistor is same as a resonant frequency of the resonance transmitting coil and the resonance capacitor.

A principle to implement the single-control series resonance circuit in the above single-control series resonance circuit embodiment is as follows. In response to the control terminal of the switch transistor K being applied with a high level, the switch transistor K is turned on, and the resonance capacitor C is short-circuited. In this case, the terminal of the resonance transmitting coil L connected to the first terminal of the switch transistor K is grounded, and a current through the resonance transmitting coil L to the ground is formed by the power source V+. Due to the characteristic of the resonance transmitting coil, a voltage across the resonance transmitting coil L cannot be abruptly changed. Therefore, the energy is stored in the resonance transmitting coil L. In response to the control terminal of the switch transistor K being applied with a low level, the switch transistor K is turned off, the energy in the resonance transmitting coil L is released for charging the resonance capacitor C. In this process, most of the energy in the resonance transmitting coil L is converted into magnetic energy and is transmitted outward, and a small part of the energy is stored in the resonance capacitor C. The switch transistor K continuously repeats the above process, and the resonance transmitting coil L continuously transmits the magnetic energy outward, providing energy for a wirelessly powered electrical appliance, i.e. a load.

In the above single-control series resonance circuit embodiment, the resonance capacitor is connected between two terminals of the switch transistor. The resonance capacitor functions to absorb the resonant current, namely, a large pulse current at two terminals of the switch transistor to prevent damage to the switch transistor. The resonance capacitor is also a part of the resonant ring in the single-control series resonance circuit.

The resonance capacitor is a part of the resonant ring, and has parameters strictly matching with the resonance transmitting coil.

The single-control series resonance circuit according to the embodiment of the present disclosure is a simple circuit including three components. The single-control series resonance circuit has the following main characteristics: a simple circuit, a low cost, a stable waveform, few harmonics, a good EMC characteristic, a great output power, being power by a single power source, being easy to control, and the like.

A coil is called a compact coil in a case that adjacent turns of windings are in close contact. A coil is called a loose coil in a case that there are gaps between adjacent turns of windings.

The resonance transmitting coil in the embodiment of the present disclosure may be replaced with an equivalent coil formed by two or more resonance transmitting coils connected in series, in parallel, or in a combination of series and parallel.

The resonance capacitor C in the embodiment of the present disclosure may be replaced with an equivalent capacitor formed by two or more resonance capacitors connected in series, in parallel, or in a combination of series and parallel.

The switch transistor in the embodiment of the present disclosure may be replaced with an equivalent switch transistor formed by two or more switch transistors connected in parallel to increase a control current.

Figure 3:
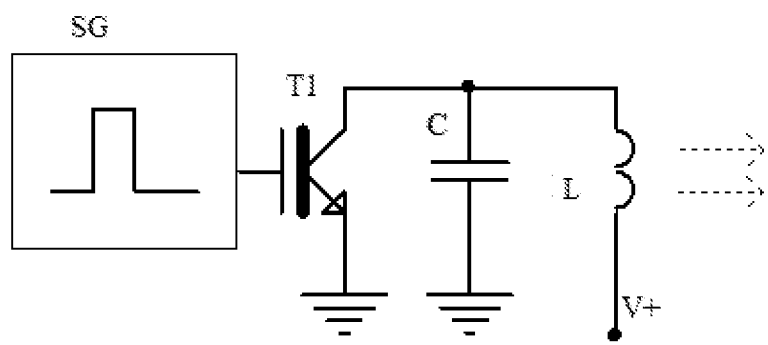
FIG. 3 is a circuit diagram of an implementation of a single-control series resonance circuit.

FIG. 3 is a circuit diagram of an implementation of a single-control series resonance circuit. The single-control series resonance circuit includes a MOSFET switch transistor T1, a resonance capacitor C, and a resonance transmitting coil L.

One terminal of the resonance transmitting coil L is connected to one terminal of the resonance capacitor C, another terminal of the resonance transmitting coil L is connected to a positive pole V+ of a power source, and another terminal of the resonance capacitor C is grounded. A control terminal of the MOSFET switch transistor T1 is connected to a signal output terminal of a signal source SG, a first terminal of the MOSFET switch transistor T1 is connected to the one terminal of the resonance capacitor C, and a second terminal of the MOSFET switch transistor T1 is connected to the other terminal of the resonance capacitor C.

Figure 4:
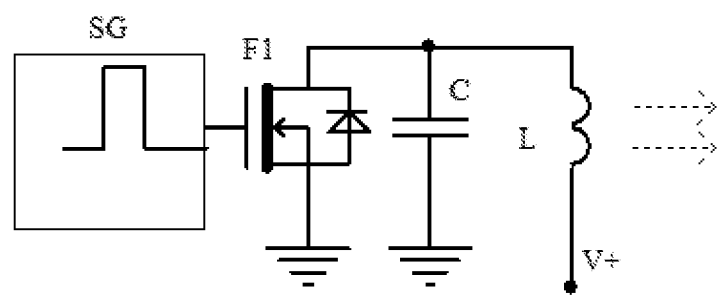
FIG. 4 is a circuit diagram of another implementation of a single-control series resonance circuit.

Reference is made to FIG. 4, which is a circuit diagram of another implementation of a single-control series resonance circuit. The single-control series resonance circuit includes an IGBT switch transistor F1, a resonance capacitor C, and a resonance transmitting coil L.

One terminal of the resonance transmitting coil L is connected to one terminal of the resonance capacitor C, another terminal of the resonance transmitting coil L is connected to a positive pole V+ of a power source, and another terminal of the resonance capacitor C is grounded. A control terminal of the IGBT switch transistor F1 is connected to a signal output terminal of a signal source SG, a first terminal of the IGBT switch transistor F1 is connected to the one terminal of the resonance capacitor C, and a second terminal of the IGBT switch transistor F1 is connected to the other terminal of the resonance capacitor C.

A signal outputted by the signal source SG may be a square-wave pulse signal or a PWM signal. The duty ratio of the signal may be less than 50%, but the present disclosure is not limited thereto.

A principle to implement the single-control series resonance circuit in the above single-control series resonance circuit embodiment is as follows. In response to the control terminal of the IGBT switch transistor F1 or the MOSFET switch transistor T1 being applied with a squire wave at a high level, i.e. a high level, the IGBT switch transistor F1 or the MOSFET switch transistor T1 is turned on, and the resonance capacitor C is short-circuited. In this case, the terminal of the resonance transmitting coil L connected to the first terminal of the IGBT switch transistor F1 or the MOSFET switch transistor T1, is grounded, and a current through the resonance transmitting coil L to the ground is formed by the power source V+. Due to a characteristic of the resonance transmitting coil, a voltage across the resonance transmitting coil L cannot be abruptly changed. Therefore, the energy is stored in the resonance transmitting coil L. In response to the control terminal of the IGBT switch transistor F1 or the MOSFET switch transistor T1 being applied with a low level, the IGBT switch transistor F1 or the MOSFET switch transistor T1 is turned off, the energy in the resonance transmitting coil L is released for charging the resonance capacitor C. In this process, most of the energy in the resonance transmitting coil L is converted into magnetic energy and is transmitted outward, and a small part of the energy is stored in the resonance capacitor C. The IGBT switch transistor F1 or the MOSFET switch transistor T1 continuously repeats the above process, and the resonance transmitting coil L continuously transmits the magnetic energy outward, providing energy for a wirelessly powered electrical appliance, i.e. a load.

A dotted arrow in the above figures indicates a transmission direction of energy generated by the resonance transmitting coil.

A wireless power transmitter is further provided according to an embodiment of the present disclosure. The wireless power transmitter includes a signal source and any of the aforementioned single-control series resonance circuits. A signal output terminal of the signal source is connected to the control terminal of the switch transistor of the single-control series resonance circuit.

According to wireless power supply, electrical energy of a power source is converted into energy which is wirelessly transmitted via a coil through electromagnetic effect, and this energy is converted back to electrical energy at a receiving terminal for powering an electric appliance.

Traditional wireless power supply includes magnetic resonance wireless power supply. The magnetic resonance wireless power supply is based on a magnetic field in a normal direction perpendicular to a coil formed through electromagnetic effect of the coil. A receiving coil can only acquire energy by keeping parallel with a plane of a resonance transmitting coil. Once the coils are not parallel, an effect of power acquisition is significantly reduced, even no power can be acquired.

Based on application space, the wireless power supply includes point-to-point wireless power supply, line-to-points wireless power supply, plane-to-points wireless power supply and space multi-point wireless power supply, among which the space multi-point wireless power supply is most technically demanding. The magnetic resonance wireless power supply is based on a magnetic field in a normal direction perpendicular to a coil formed through electromagnetic effect of the coil. A receiving coil can only acquire energy by keeping parallel with a plane of a resonance transmitting coil. Once the coils are not parallel, an effect of power acquisition is significantly reduced, even no power can be acquired.

A space magnetic field is required such that the receiving coil can acquire power in different positions and different orientations. One resonance transmitting coil can only form a magnetic field in one direction. To form a space magnetic field, at least two transmitting circuits are required. There is a problem when multiple resonance transmitters operate simultaneously: there is serious mutual interference and the resonance transmitter may even be damaged if operating frequencies are the same. In a case that the operating frequencies are different, although a space magnetic field can be formed, the receiving coil can receive energy of only one frequency, and the space magnetic field is meaningless.

Therefore, the key to achieve the wireless power supply in space, which is also the key point of the embodiments of the present disclosure, is to cause multiple resonance transmitters which have the same frequency to cooperate with each other without interfering with each other.

Figure 5:
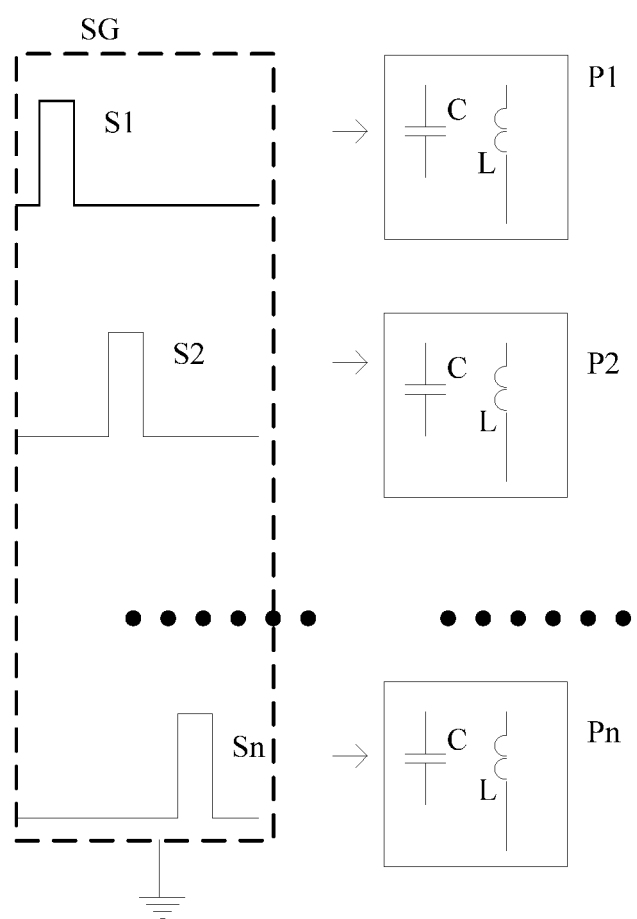
FIG. 5 is a circuit diagram of a complementary wireless power transmitter.

A complementary wireless power transmitter is provided according to an embodiment of the present disclosure. Reference is made to FIG. 5, which is a circuit diagram of a complementary wireless power transmitter. The complementary wireless power transmitter includes a signal source SG and N resonance transmitters P1 to Pn.

The signal source SG includes N signal output terminals, and each signal output terminal outputs a signal. N signals are respectively S1, S2, ..., and Sn. The N signals outputted by the N signal output terminals have the same frequency and a phase difference of 360°/N. Namely, phases of the N signals are complementary. N is a positive integer greater than or equal to 2 and less than or equal to 360.

For example, in case of N=2, the phase difference is 180°. In a case that the phase of one signal is 0°, the phase of the other signal is 180°. In a case that the phase of one signal is 90°, the phase of the other signal is 270°. In case of N=3, the phase difference is 120°. In a case that the phase of one signal is 0°, the phases of the other two signals are 120° and 240° respectively. In case of N=4, the phase difference is 90°, and the phases of the 4 signals may be 0°, 90°, 180°, 270°, respectively. Other cases can be deduced accordingly.

FIG. 6(a) is a waveform diagram of two signals in case of N=2. FIG. 6(b) is a waveform diagram of three signals when N=3. It can be seen from FIG. 6(a) that the phase difference between the signal S1 and the signal S2 is 180°. It can be seen from FIG. 6(b) that the phase difference among the signal S1, the signal S2 and the signal S3 is 120°. The signals shown in FIG. 6(a) and FIG. 6(b) are PWM signals. The signals in the embodiment of the present disclosure may also be other signals, such as square wave signals, which may be determined according to a practical situation and not limited by the embodiment of the present disclosure.

A duty ratio of the square wave signal or the PWM signal may be less than 50%, and is not specifically limited by the embodiment of the present disclosure.

There are two types of signal source SG. One is a hardware signal source, and the other is a software signal source.

The N resonance transmitters respectively correspond to the N signal output terminals of the signal source. Namely, an input terminal of each of the resonance transmitters is connected to one of the signal output terminals of the signal source SG. Each of the resonance transmitters includes a resonance circuit. The resonance circuit includes a resonance transmitting coil and a resonance capacitor. An angle between planes at which the N resonance transmitting coils are respectively located is a preset angle.

The preset angle may be determined according to a position of an electric appliance in a practical situation. The number N of the resonance transmitters is also based on a practical space in which the electric appliance is located. For example, for different application spaces, the value of the number N of the resonance transmitters may be determined according to the environment such as the number of wall surfaces. Examples are as follows.

In a case that a ground appliance and a ceiling appliance in a room are required to be wirelessly powered simultaneously, N may be chosen to be 2. A two-phase complementary wireless power transmitter is used (in the embodiment of the present disclosure, the complementary wireless power transmitter which simultaneously outputs two signals of which the phases are complementary is called a complementary two-phase wireless power transmitter, and is referred to as a two-phase transmitter; the complementary wireless power transmitter which simultaneously outputs three signals of which the phases are complementary is called a three-phase complementary wireless power transmitter, and is referred to as a three-phase transmitter; the complementary wireless power transmitter which simultaneously outputs four signals of which the phases are complementary is called a four-phase complementary wireless power transmitter, and is referred to as a four-phase transmitter; and other cases can be deduced accordingly). Two resonance circuits are distributed on the ground and on the ceiling. In this case, the preset angle between the two resonance transmitting coils is 0°.

As shown in FIG. 7, the resonance transmitting coil L1 and the resonance transmitting coil L2 are parallel with each other when distributed in space. The signals driving the two resonance transmitting coils have complementary characteristics, namely, the phase difference is 180°. Accordingly, a magnetic field formed between the two resonance transmitting coils also has a complementary characteristic. Namely, the magnetic field between the resonance transmitting coil L1 and the resonance transmitting coil L2 in the room is a sum of the magnetic fields generated by the two resonance transmitting coils.

In a case that a ground appliance, a wall appliance and a ceiling appliance in a room are required to be wirelessly powered simultaneously, N may be chosen to be 3. A three-phase complementary wireless power transmitter is used. Three resonance circuits are respectively distributed on the ground, on the wall surface and on the ceiling. In this case, the preset angle between the three resonance transmitting coils may be 90°.

As shown in FIG. 8, in space distribution, the resonance transmitting coil L1, the resonance transmitting coil L2, and the resonance transmitting coil L3 do not intersect with each other, and there is a certain angle between the planes at which the three resonance transmitting coils are located. The signals driving the three resonance transmitting coils have a complementary characteristic, namely, the phase difference is 120°. Accordingly, magnetic fields formed in an angle region among the three resonance transmitting coils also has a complementary characteristic. Namely, strength of the magnetic field is geometrical superposition of the magnetic fields generated by the three resonance transmitting coils.

The three resonance transmitting coils may intersect with each other, and there is a certain angle between the planes at which the resonance transmitting coils are located. The signals driving the three resonance transmitting coils have a complementary characteristic. Accordingly, a magnetic field formed in eight regions, formed by intersecting the three coils, also has a complementary characteristic. Namely, strength of the magnetic field is geometrical superposition of the magnetic fields generated by the three resonance transmitting coils in the corresponding region.

In a case that a ground appliance, appliances on four wall surfaces and a ceiling appliance in a room are required to be wirelessly powered simultaneously, N may be chosen to be 6. A six-phase complementary wireless power transmitter is used. Six resonance circuits are respectively distributed on the ground, on the four wall surfaces, and on the ceiling. In this case, for the six resonance transmitting coils, an angle between the planes at which the resonance transmitting coils distributed on the ground and on the ceiling are located is 0°, an angle between the planes at which the resonance transmitting coils distributed on two opposite wall surfaces among the four wall surfaces are located is 0°, and an angle between the planes at which the resonance transmitting coils distributed on two adjacent wall surfaces are located is 90°. An angle between the planes at which the resonance transmitting coils distributed on the ground and on each of the four walls are located is 90°. Namely, the preset angle according to the embodiment of the present disclosure may include multiple different angles. In the example, the preset angle includes 0° and 90°. In a practical application, the preset angle may also be other values, such as 180° or 60°.

In the above examples, since the phases of signals are complementary, the energy generated by the N resonance transmitters is also complementary.

The complementary wireless power transmitter of the type according to the embodiment of the present disclosure includes N resonance transmitters, and the electromagnetic energy generated by the N resonance transmitters has different phases and the same frequency. A stable space magnetic field can be formed in a space without interference among the N resonance transmitters. In this space, the receiving coil may acquire power in all of N directions, thus wireless, free and safe power supply is achieved.

For a resonant ring, a resonance transmitting coil and a resonance capacitor which operate at a resonant state may be connected in to manners, namely, in series and in parallel. Such a combination of the resonance transmitting coil and the resonance capacitor in the resonant state is referred to as the resonant ring. There are at least two resonant rings in a wireless power supply system. One is a transmitting resonant ring, including a resonance transmitting coil and a resonance capacitor which are connected in series or in parallel. The other is a receiving resonant ring, formed by a receiving coil and a resonance capacitor which are connected in series or in parallel.

The frequency of each of the N signals is same as a free resonance frequency of the resonance circuit.

In the complementary wireless power transmitter according to the embodiment of the present disclosure, one signal source generates the N signals having the same frequency and the phase difference of 360°/N. The N signals drive the N resonance transmitters respectively, and the angle between the planes at which the resonance transmitting coils in the N resonance transmitters are located is a preset angle. The phase difference of the N signals is 360°/N, namely, the N signals have complementary phases. Accordingly, the magnetic fields generated by the N resonance transmitting coils do not interfere with each other, and the magnetic field in a common space among the N resonance transmitting coils also has the complementary characteristic. Namely, the strength of the magnetic field is a geometric superposition of the magnetic fields generated by the N resonance transmitting coils. The directions of the magnetic fields include N normal directions perpendicular to the resonance transmitting coils. Namely, the space magnetic field is formed, and the receiving coil can receive energy in the N directions, improving the effect of power acquisition of the receiving coil in comparison with the conventional technology. Reference is made to FIG. 2, which is a circuit diagram of an implementation of a resonance circuit in a complementary wireless power transmitter. Each resonance circuit includes a resonance transmitting coil L, a resonance capacitor C, and a switch transistor T. The resonance circuit may be referred to as a single-controlled series resonance circuit.

One terminal of the resonance transmitting coil L is connected to one terminal of the resonance capacitor C, another terminal of the resonance transmitting coil L is connected to a positive pole V+ of a power source, and another terminal of the resonance capacitor C is grounded. A control terminal of the switch transistor T is connected to a signal output terminal of the signal source SG, a first terminal of the switch transistor T is connected to the one terminal of the resonance capacitor C, and a second terminal of the switch transistor T is connected to the other terminal of the resonance capacitor C.

In any of the aforementioned wireless power transmitter embodiments, the signal source SG may include N drive amplifiers. Each of the N signals generated by the signal source SG is outputted to the resonance transmitter via one of the drive amplifiers. The N drive amplifiers are integrated into the signal source for ensuring strengths of the N signals.

It can be appreciated that the drive amplifier may not be integrated in the signal source. In any of the aforementioned wireless power transmitters, the resonance transmitter may include a drive amplifier. An input terminal of the drive amplifier is connected to one of the signal output terminals of the signal source, and the output terminal of the amplifier is connected to the control terminal of the switch transistor.

Figure 9:
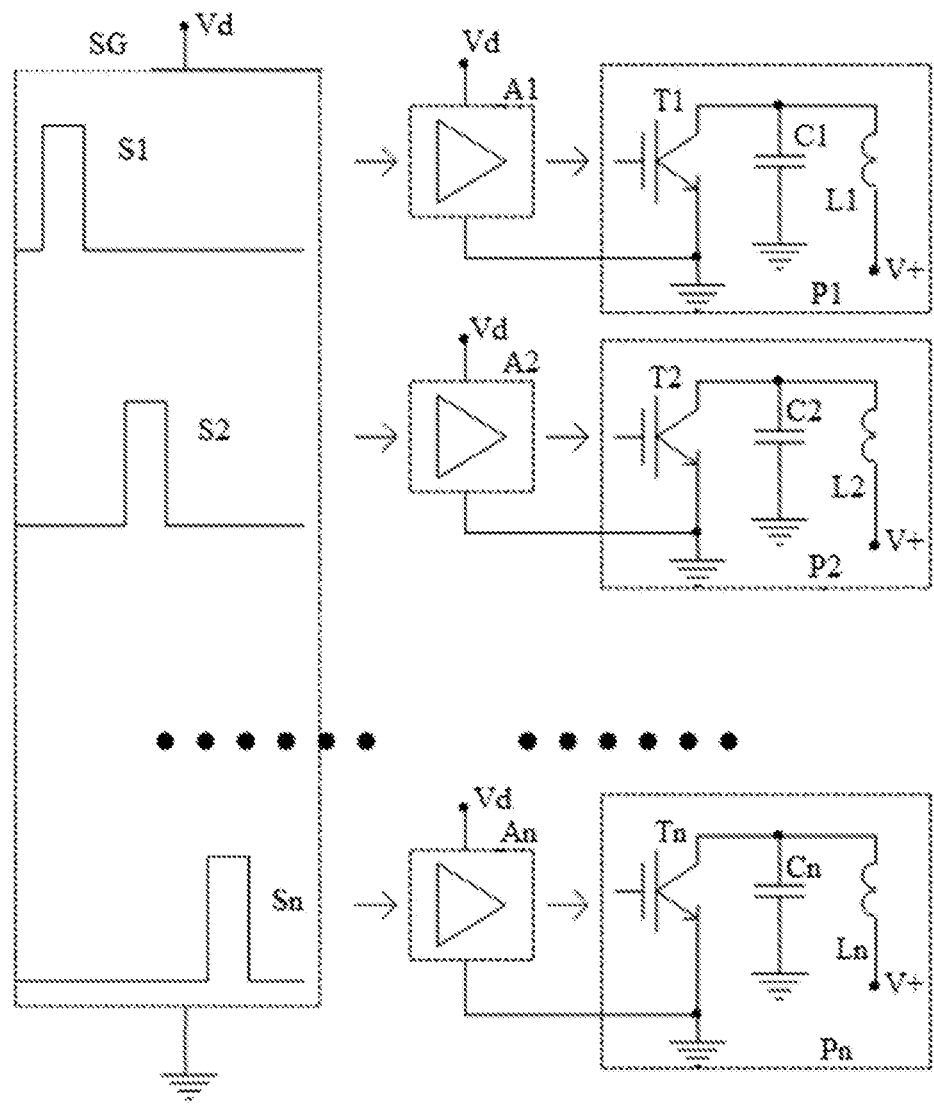
FIG. 9 is a circuit diagram of a complementary wireless power transmitter.

Reference is made to FIG. 9, which is a circuit diagram of a complementary wireless power transmitter. In FIG. 9, SG denotes the signal source. S1, S2, . . . , and Sn are N complementary PWM signals generated by the signal source. A1, A2, . . . , and An represent N drive amplifiers. P1, P2, . . . , and Pn represent resonance circuits. T1, T2, . . . , and Tn are switch transistors. L1, L2, . . . , and Ln represent resonance transmitting coils. C1, C2, . . . , and Cn represent resonance capacitors. T1, T2, . . . , and Tn may be MOSFETs or IGBTs.

The switch transistors in FIG. 9 are MOSFETs. It is appreciated that the switch transistors in FIG. 9 may be IGBTs.

In any of the aforementioned complementary wireless power transmitters, the signal source SG and the drive amplifier share a common low voltage power source Vd, the resonance circuits share a common high voltage power source V+, and the signal source SG, the drive amplifier, and the resonance circuits share the ground.

"The ground" is a reference point at a relative level of zero, and generally refers to a negative pole of the power source.

According to wireless power supply, electrical energy of a power source is converted into energy which is wirelessly transmitted via a coil through electromagnetic effect, and this energy is converted back to electrical energy at a receiving terminal for powering an electric appliance.

A wireless power supply system includes a wireless power transmitter and a receiving circuit. The wireless power transmitter includes an LC series resonant ring. The LC series resonant ring includes a power supply circuit, a resonance transmitting coil, and a resonance capacitor. The resonance transmitting coil converts electrical energy in the power supply circuit into magnetic field energy. The receiving circuit converts the received magnetic field energy into electrical energy to power to the load. In order to transmit the magnetic field energy for a great distance, it is required to increase a frequency at which the wireless power supply system transmits the magnetic field energy. In such case, expensive high-frequency switching device is required to control a frequency at which the resonance transmitting coil transmits the magnetic field energy.

Frequent turning on and turning off of the high-frequency switching device cause severe heating of high-frequency switching device, which easily leads to damage of the high-frequency device. Therefore, stability of the wireless power supply system is reduced. In addition, the high-frequency device is expensive, resulting in a significant increase in the cost of the wireless power supply system.

A switch circuit and a multi-control series resonance circuit are further provided according to an embodiment of the present disclosure. The multi-control series resonance circuit includes a switch circuit and an LC series resonant ring. The LC series resonant ring includes a resonance transmitting coil L and a resonance capacitor C. One terminal of the resonance transmitting coil L is connected to one terminal of the resonance capacitor C, another terminal of the resonance transmitting coil L is connected to a positive pole V+ of a power source, and another terminal of the resonance capacitor C is grounded.

Figure 10:
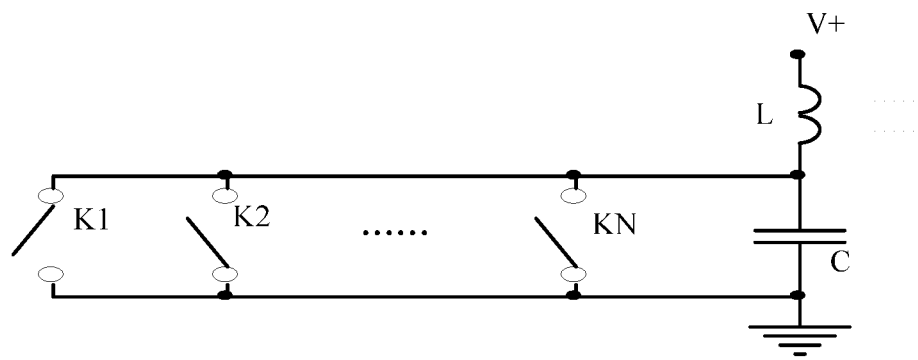
FIG. 10 is a circuit diagram of a multi-control series resonance circuit including a switch circuit according to an embodiment of the present disclosure.

Reference is made to FIG. 10, which is a circuit diagram of a multi-control series resonance circuit including a switch circuit according to an embodiment of the present disclosure.

The switch circuit includes N switch transistors (represented by K1, K2, . . . , and KN in FIG. 1) connected in parallel. A first terminal of each of the N switch transistors is connected to the one terminal of the resonance capacitor C, and a second terminal of each of the N switch transistors is connected to the other terminal of the resonance capacitor C. N is a positive integer greater than or equal to 2.

Only one of the N switch transistors is turned on at a time instant. A sum of turn-on frequencies of the N switch transistors equals to a resonant frequency of the LC series resonant ring. The turn-on frequency is a frequency at which the switch transistor is turned on. Any one of the switch transistors in the switch circuit cooperates with the LC series resonant ring to form a single-control series resonance circuit.

The N switch transistors are connected in parallel, but the N switch transistors are asynchronous switches, and are turned on or off at different time instants. Specifically, within one resonant period of the LC series resonant ring, one of the N switch transistors is turned on/off once. Namely, in one resonant period, only one switch transistor A is turned on. The LC series resonant ring is charged via the switch transistor which is turned on. Namely, an on-time period of the switch transistor A is a charging time period of the LC series resonant ring. When the on-time period of the switch transistor A ends, the LC series resonant ring is required to be discharged before a next switch transistor B is turned on. A time period from the end of the on-time period of the switch A and to a time instant when the next switch transistor B is turned on is the discharging time period of the LC series resonant ring. Namely, the resonant period of the LC series resonant ring includes the charging time period and the discharging time period.

Only one of the N switch transistors is turned on at a time instant for charging the LC series resonant ring, so that resonance of the LC series resonant ring is continuously maintained. Each time when the switch transistor is turned on then off, the LC series resonant ring is charged and discharged, namely, the resonance occurs once. Therefore, the resonant frequency of the LC series resonant ring is the sum of the turn-on frequencies of the N switch transistors. For example, in a case that the resonant frequency of the LC series resonant ring is 70, N may be equal to 70. Accordingly, each switch transistor is to be turned on once per second. Alternatively, N may be equal to 35, and each switch transistor is to be turned on twice per second. Alternatively, N may be 30, some switch transistors are turned on 4 times per second, some switch transistors are turned on 5 times per second, some switch transistors switch are turned on once per second, and the like. In the embodiment of the present disclosure, the turn-on frequencies of the switch transistors may be different or the same, which is not specifically limited in the embodiment of the present disclosure.

Conversely, in a case that the resonant frequency of the LC series resonant ring is certain, the turn-on frequency of each switch transistor may be 1/N of the resonant frequency, or the turn-on frequency of some of the switch transistors is 2/N, 3/N, 4/N of the resonant frequency, or the like, which may be set according to a performance of the switch transistors in a practical situation. The turn-on frequency of the switch transistor with a good performance may be set relatively great, and the turn-on frequency of the switch transistor with a poor performance can be set relatively small. In a case that the turn-on frequencies of the switch transistors are the same, the resonance frequency is f0, and a switching frequency of the switch transistor is fk, the following equations can be acquired:

Resonant frequency $f0=N*$switching frequency $fk$, or Switching frequency $fk=$resonant frequency $f0/N$.

In the embodiment of the present disclosure, the low-frequency switch transistor can be used to control the high-frequency LC series resonant ring, so as to transmit magnetic field energy at a high frequency. It is the practical significance of the embodiment of the present disclosure.

The switch transistor may be an IGBT or a MOSFET. In the embodiment of the present disclosure, the switch transistor may be an NMOSFET. In this case, the first terminal may be the drain, and correspondingly, the second terminal is the source, and the control terminal is the gate. The switch transistor may be a PMOSFET. In this case, the first terminal is the source, the second terminal is the drain, and the control terminal is the gate. The switch transistor may be an IGBT. In this case, the first terminal is the collector, and correspondingly, the second terminal is the emitter, and the control terminal is the gate.

The resonance transmitting coil L in the embodiment of the present disclosure may be replaced with an equivalent coil formed by two or more resonance transmitting coils connected in series, in parallel, or in a combination of series and parallel.

The resonance capacitor C in the embodiment of the present disclosure may be replaced with an equivalent capacitor formed by two or more resonance capacitors connected in series, in parallel, or in a combination of series and parallel.

The switch transistor in the embodiment of the present disclosure may be replaced with an equivalent switch transistor formed by two or more switch transistors connected in parallel to increase a control current.

A switch circuit is provided according to the embodiment of the present disclosure. The switch circuit includes the N switch transistors connected in parallel. Only one of the N switch transistors is turned on at a time instant. Each time when one switch transistor is turned on and off once, the LC series resonant ring resonates once. The sum of the turn-on frequencies of the N switch transistors is the resonant frequency of the LC series resonant ring, namely, the N switch transistors are turned on and off in turn to control the LC series resonant ring to transmit high-frequency magnetic field energy. For each switch transistor, the frequency of turning on or off is not high, so that less heat is generated and damage does not easily occur, thereby improving stability. Because the N switch transistors may be commercially available switch transistors with a low cost, the additional cost is low and may even be negligible.

It can be appreciated that, in order to achieve asynchronous control of the N switch transistors, a signal source capable of outputting N control signals is required. Accordingly, the above switch circuit may further include a signal source SG.

Figure 11:
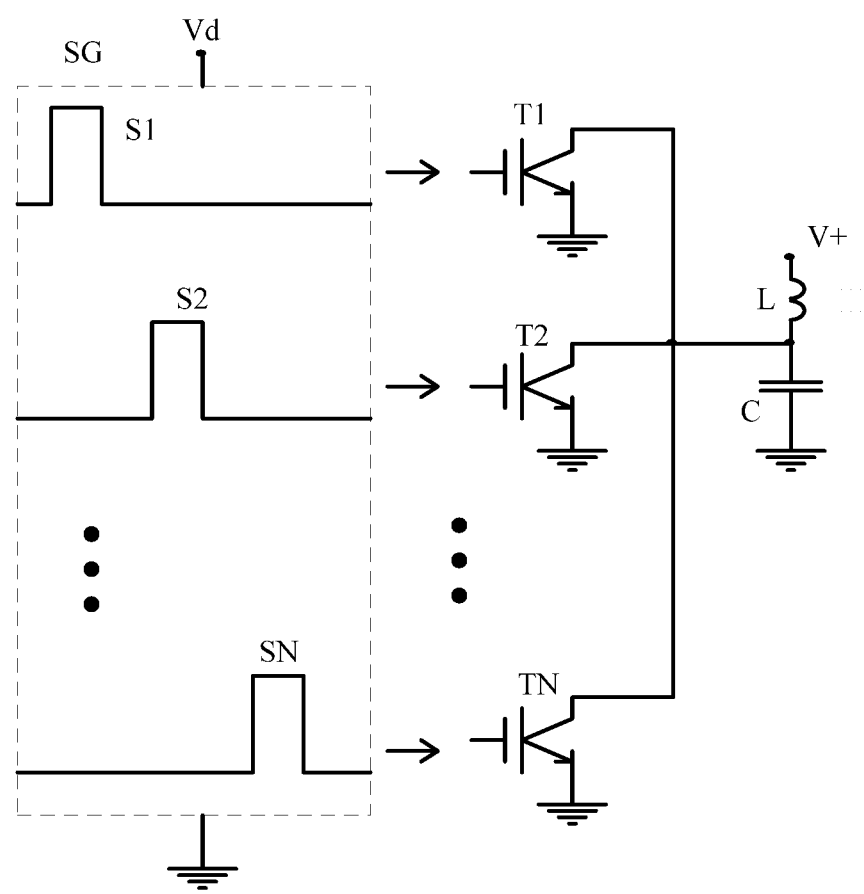
FIG. 11 is a waveform diagram of N control signals outputted by a signal source SG in a switch circuit according to an embodiment of the present disclosure.

FIG. 11 is a circuit diagram of another implementation of a multi-control series resonance circuit including a switch circuit according to an embodiment of the present disclosure.

In FIG. 11, K1, K2, . . . , and KN represent N switch transistors. S1, S2, . . . , and SN represent N control signals generated by the signal source SG. The signal source SG is powered by a low voltage power source Vd. The signal source SG and the LC series resonant ring share the ground.

"The ground" is a reference point at a relative level of zero, and generally refers to a negative pole of the power source.

Figure 12:
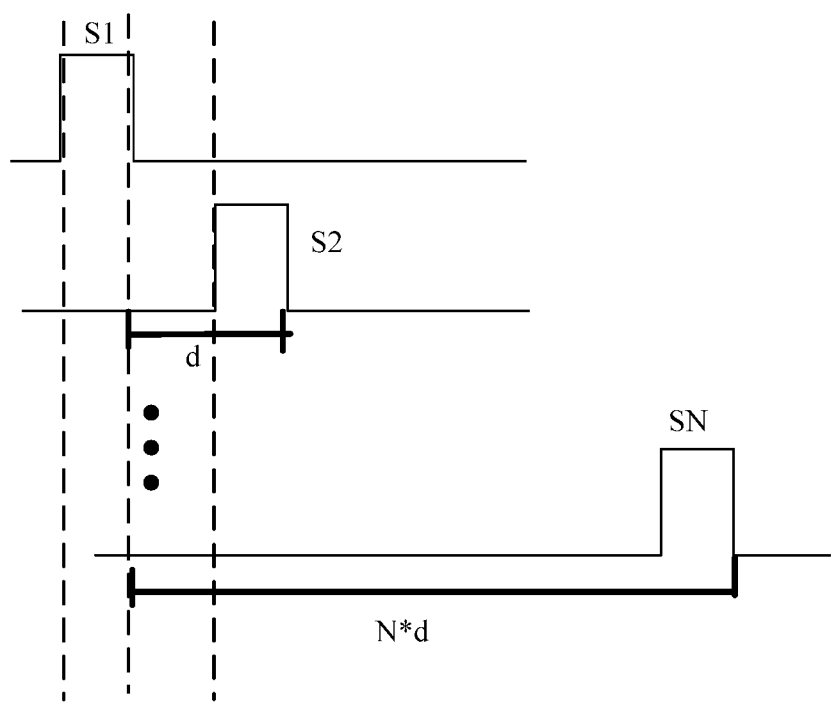
FIG. 12 is a waveform diagram of N control signals outputted by a signal source SG according to an embodiment of the present disclosure.

FIG. 12 is a waveform diagram of N control signals outputted from a signal source SG. FIG. 3 shows a relationship among N control signals, where a PWM signal is taken as an example of the control signal. S1, S2, . . . , and SN represent the N control signals generated by the signal source SG. Due to the N control signals shown in FIG. 3, the N switch transistors have the same turn-on frequency.

The signal source SG includes N signal output terminals. The signal source SG generates the N control signals respectively corresponding to the N signal output terminal. The N control signals have the same frequency. The N signal output terminals of the signal source SG are respectively connected with control terminals of the N switch transistors. In the N control signals outputted by the signal source SG, at least N time instants for outputting a high level form an arithmetic progression with the resonant period of the LC series resonant ring as the common difference. The amplitude of the high level of each control signal is greater than or equal to the turn-on voltage of the switch transistor driven by the control signal.

It can be seen from FIG. 12 that duration of the high levels of the control signals are the same, and the control signals are at a low level at other time periods. The switch transistor is turned on during the duration of the high level, namely, the duration of the high level is an on-time period of the switch transistor. In the embodiment of the present disclosure, the control signal may include only a high-level signal. Namely, the switch transistor is turned on as long as the control signal is inputted to the control terminal of the switch transistor. Otherwise, the switch transistor is maintained off. It is appreciated that the control signal may include a high-level signal and a low-level signal.

Each of control signals drives one switch transistor, as long as the amplitude of the high level of the control signal is greater than or equal to the turn-on voltage of the switch transistor driven by the control signal. The control signal may be a PWM signal, a triangular wave signal, a sinusoidal wave signal, or the like.

As shown in FIG. 12, the abscissa indicates time, and the control signals SN, SN−1, . . . , S2, S1 are sequentially outputted in order of time. The above control signals are outputted repeatedly and cyclically, such that the N switch transistors are turned on alternately.

Figure 13:
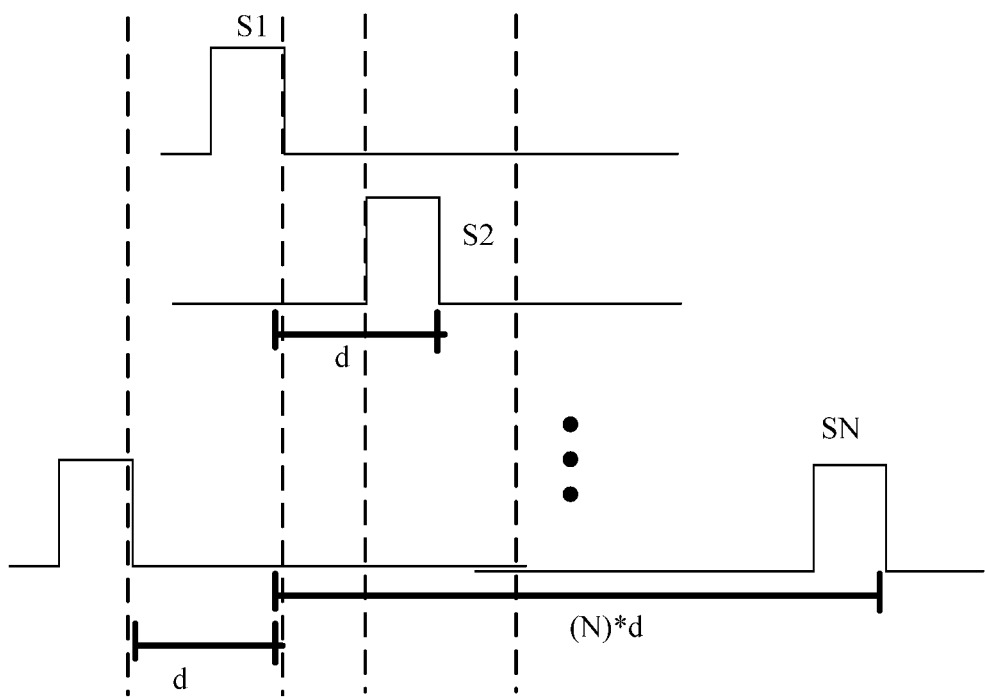
FIG. 13 is a waveform diagram of N control signals outputted by a signal source SG according to another embodiment of the present disclosure.

It is appreciated that the turn-on frequencies of the switch transistors can be different, which is as shown in FIG. 13, as long as the at least N time instants for outputting a high level, corresponding to the N control signals, form the arithmetic progression with the resonant period of the LC series resonant ring as the common difference.

Assuming that the resonant frequency of the LC series resonant ring is 50 and N=49, the control signal of any switch transistor may be shown as the control signal SN.

The LC series resonant ring resonates once within the time period of d.

The N control signals outputted by the signal source SG have the same operating frequency. At one time instant in the resonant period of the LC series resonant ring, only one signal output terminal outputs the control signal.

Optionally, assuming the resonant period of the LC series resonant ring to be d, the control signal outputted by each signal output terminal of the signal source SG is configured such that that the on-time period of the switch transistor does not exceed d/2, namely, the high-level time period of the control signal is no greater than d/2.

Optionally, the control signal is required to be amplified by a drive amplifier, to drive the switch transistor. The signal source SG may include N drive amplifiers. Each of the control signals generated by the signal source is outputted via one of the drive amplifiers. Output terminals of the N drive amplifiers are the N signal output terminals of the signal source.

In this case, in the aforementioned "the amplitude of the high level of each control signal is greater than or equal to the turn-on voltage of the switch transistor driven by the control signal", the control signal refers to the outputted control signal amplified by the drive amplifier.

The signal source SG and the N drive amplifiers may share a common low voltage power source.

Figure 14:
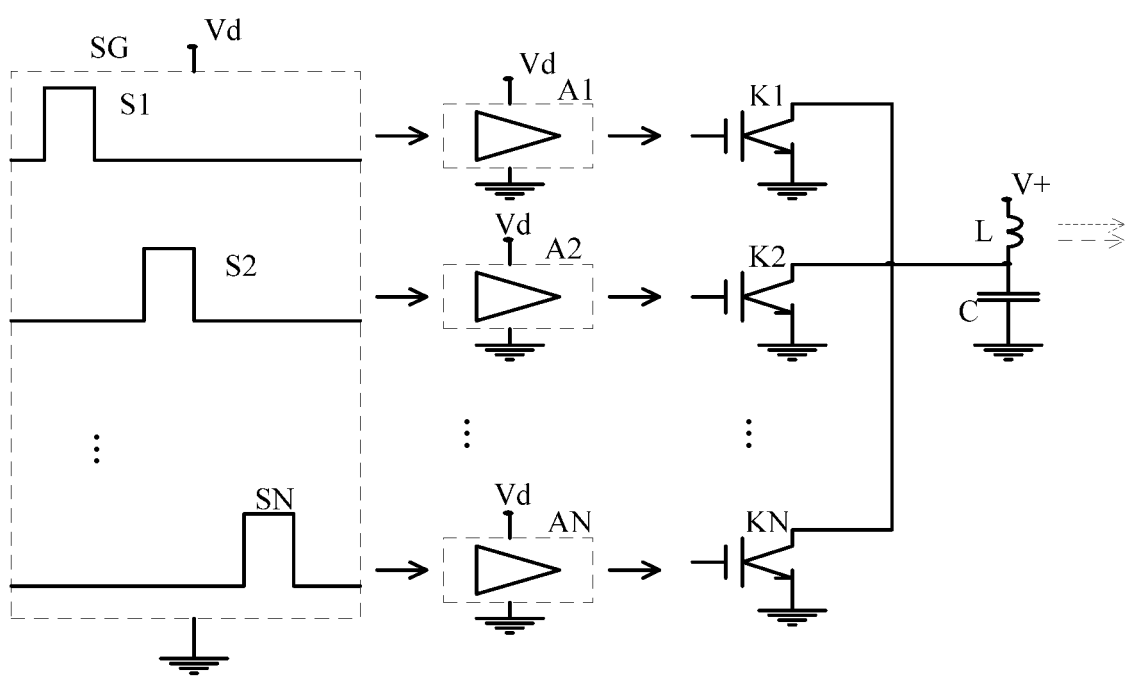
FIG. 14 is a circuit diagram of another implementation of a multi-control series resonance circuit including a switch circuit according to an embodiment of the present disclosure.
Figure 15:
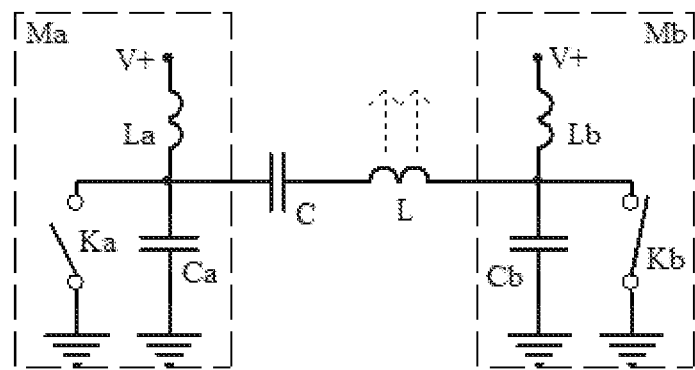
FIG. 15 shows a circuit of an implementation of a full-bridge transmitting circuit applied for wireless power supply, which is driven by a single power source.
Figure 16:
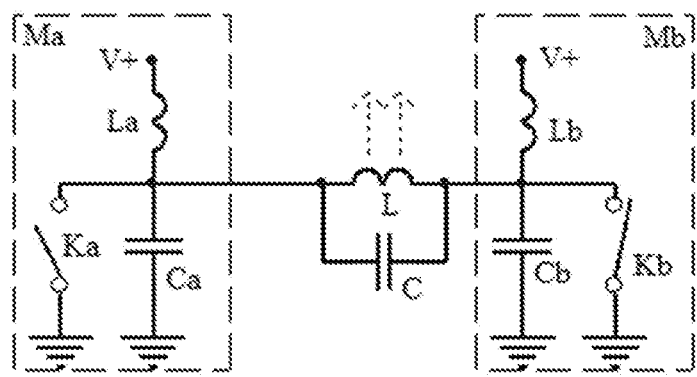
FIG. 16 shows a circuit of an implementation of a full-bridge transmitting circuit applied for wireless power supply, which is driven by a single power source.
Figure 17:
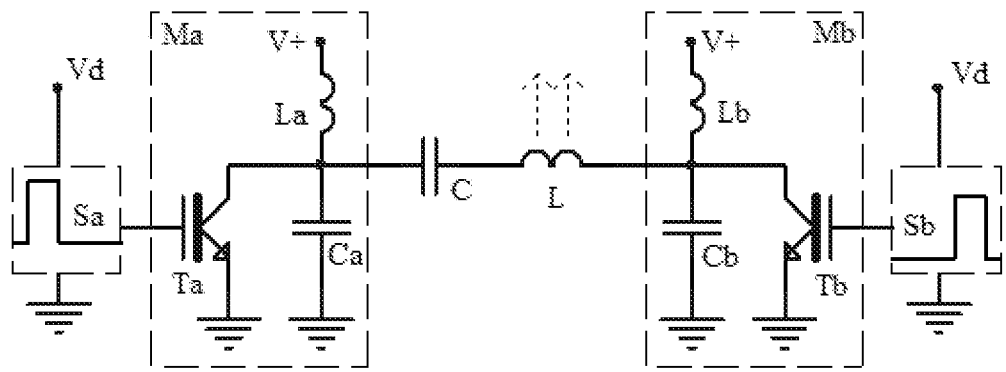
FIG. 17 shows a circuit of an implementation of a full-bridge transmitting circuit applied for wireless power supply, which is driven by a single power source.
Figure 18:
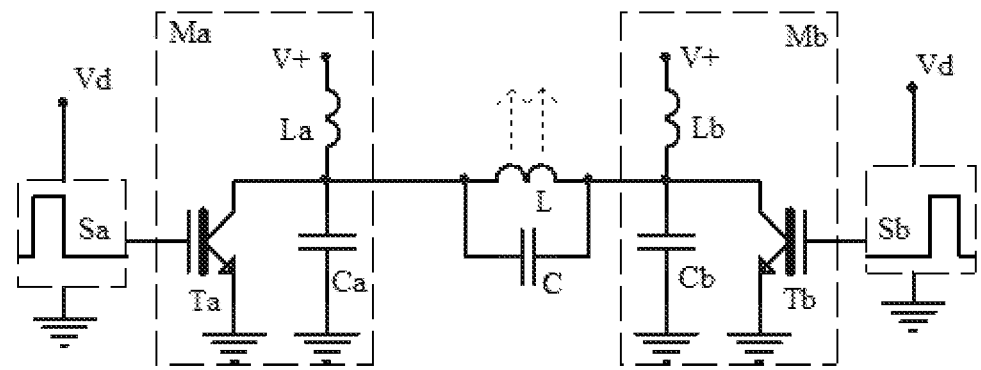
FIG. 18 shows a circuit of an implementation of a full-bridge transmitting circuit applied for wireless power supply, which is driven by a single power source.
Figure 19:
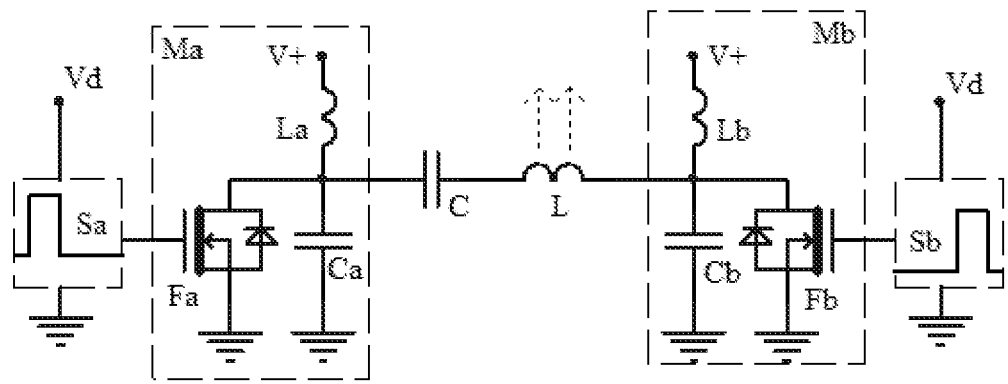
FIG. 19 shows a circuit of an implementation of a full-bridge transmitting circuit applied for wireless power supply, which is driven by a single power source.
Figure 20:
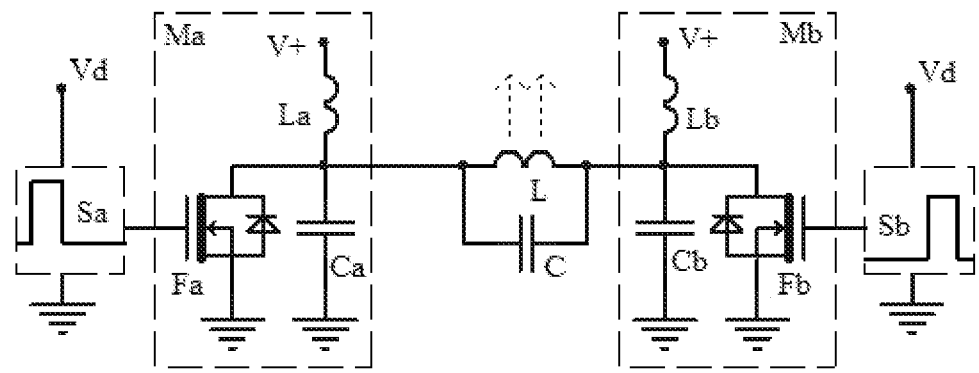
FIG. 20 shows a circuit of an implementation of a full-bridge transmitting circuit applied for wireless power supply, which is driven by a single power source.
Figure 21:
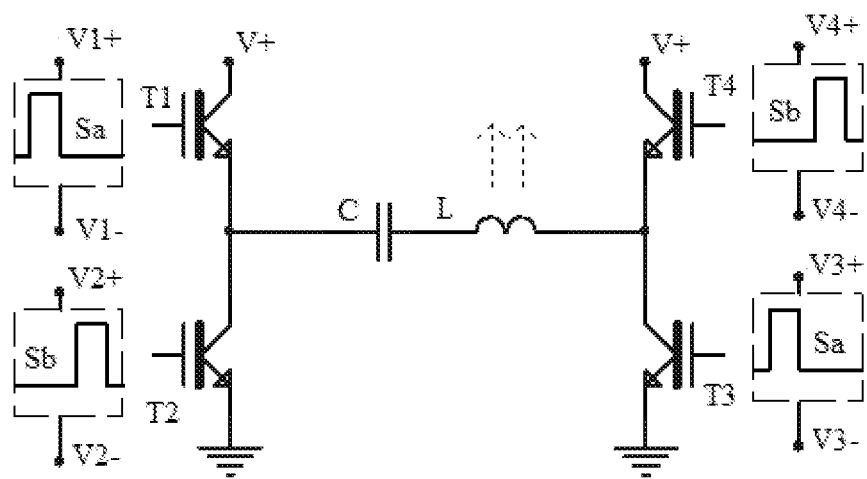
FIG. 21 shows a circuit of an implementation of a conventional full-bridge transmitting circuit driven by four power sources.
Figure 22:
FIG. 22 is a timing diagram of driving signals.

FIG. 14 is a circuit diagram of another implementation of the multi-control series resonance circuit including a switch circuit according to an embodiment of the present disclosure.

SG denotes the signal source. S1, S2, . . . , and SN are N control signals generated by the signal source. A1, A2, . . . , and AN represent N drive amplifiers. K1, K2, . . . , and KN are N switch transistors, which may be MOSFETs or IGBTs. The signal source SG and the drive amplifiers may share a common low voltage power source Vd. The signal source SG, the drive amplifiers, and the LC series resonant ring share the ground.

In a case that the amplitude of the control signal outputted by the signal source SG is great enough, the switch transistor may be directly driven to be turned on and off by the control signal without the drive amplifier.

According to wireless power supply, electrical energy of a power source is converted into energy which is wirelessly transmitted via a coil through electromagnetic effect, and this energy is converted back to electrical energy at a receiving terminal for powering an electric appliance.

In current application of wireless power supply, a full-bridge circuit is a favorable power output circuit. The full-bridge circuit has a complete current waveform and a complete voltage waveform, a good EMC characteristic, and a great output power. The full-bridge circuit includes two bridge arms. A left bridge arm includes an upper switch transistor and a lower switch transistor connected in series, and a right bridge arm includes an upper switch transistor and a lower switch transistor connected in series. One terminal of a resonant ring is connected to a midpoint of the left bridge arm, and the other terminal of the resonant ring is connected to a midpoint of the right bridge arm. The bridge arm is formed by an upper transistor and a lower transistor which are connected in series and operate at different potentials. Therefore, 4 or 5 isolated power supplies are required for driving. The circuit is complicated, and a cost is high.

Therefore, there is an urgent need for a full-bridge transmitting circuit with a simple circuit and a good EMC characteristic.

Reference is made to FIGS. 15 to 23. FIG. 2 is a circuit diagram of a full-bridge transmitting circuit driven by a single power source according to an embodiment. The full-bridge transmitting circuit includes three resonant ring circuits, two switch transistors, and one drive power source.

The three resonant ring circuits are a first resonant ring circuits, a second resonant ring circuit, and a third resonant ring circuit. The two switch transistors are a first switch transistor and a second switch transistor.

A connection relationship is as follows.

The first switch transistor is connected in parallel with a resonance capacitor of the first resonant ring circuit. The second switch transistor is connected in parallel with a resonance capacitor of the third resonant ring circuit. The second resonant ring circuit is connected between a midpoint of the first resonant ring circuit and a midpoint of the third resonant ring circuit.

Preferably, the first resonant ring circuit and the first switch transistor form a first single-control series resonance circuit, and the third resonant ring circuit and the second switch transistor form a second single-control series resonance circuit.

Figure 23:
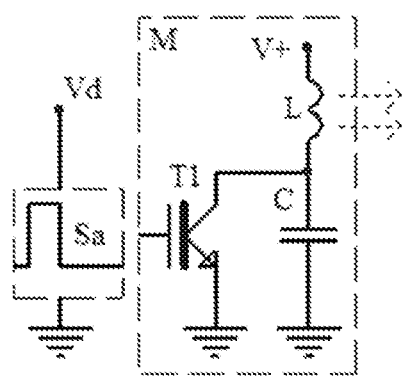
FIG. 23 shows a circuit of an implementation of a single-control series resonance circuit applied for wireless power supply.

Referring to FIG. 23, a single-control series resonance circuit includes a switch transistor, a resonance transmitting coil, and a resonance capacitor.

One terminal of the resonance transmitting coil is connected to one terminal of the resonance capacitor, another terminal of the resonance transmitting coil is connected to a positive pole of a power source, and another terminal of the resonance capacitor is grounded. A first terminal of the switch transistor is connected to the one terminal of the resonance capacitor, and a second terminal of the switch transistor is connected to the other terminal of the resonance capacitor.

Preferably, the switch transistor is a MOSFET or an IGBT. The resonance capacitor is an equivalent resonance capacitor, an inductor is an equivalent inductor, and/or the switch transistor is an equivalent switch transistor. A frequency of a signal driving the first switch transistor is complementary to a frequency of a signal driving the second switch transistor. The second resonant ring circuit includes a second resonance capacitor and a second resonance transmitting coil. The second resonance capacitor is connected in series or in parallel with the second resonance transmitting coil.

The working principle of the single-control series resonance circuit is as follows.

Ma is a left single-control series resonant ring, and includes a secondary resonance inductor La, a secondary resonance capacitor Ca, and a switch Ka. The secondary resonance inductor La and the secondary resonance capacitor Ca are connected in series to form a left secondary resonant ring. The switch Ka and the secondary resonance capacitor Ca are connected in parallel. Mb is a right single-control series resonant ring, and includes a secondary resonance inductor Lb, a secondary resonance capacitor Cb, and a switch Kb. The secondary resonance inductor Lb and the secondary resonance capacitor Cb are connected in series to form a right secondary resonant ring. The switch Kb and the secondary resonance capacitor Cb are connected in parallel.

A primary resonance inductor L and a primary resonance capacitor C are connected in series to form a primary resonant ring, which is connected between midpoints of the left secondary resonant ring and the right secondary resonant ring. The switch Ka and the switch Kb are complementary to each other. Only one of Ka and Kb is turned on at a time instant. When the switch Ka is turned off, the switch Kb is turned on. When the switch Kb is turned off, the switch Ka is turned on. Namely, a loop of Ka being turned on - - - Ka being turned off and Kb being turned off - - - Kb being turned on - - - Ka being turned off and Kb being turned off - - - Ka being turned on is repeated.

In a case that Ka is turned on and Kb is turned off, the resonance capacitor Ca is short-circuited to ground, and energy is stored in the resonance inductor La. At this time, energy in the inductor Lb passes through the main resonant ring LC, and forms a current via Ka to the ground. Energy is converted into a magnetic field through the primary resonance inductor L and transmitted outward.

In a case that Kb is turned on and Ka is turned off, the resonance capacitor Cb is short-circuited to ground, and energy is stored in the resonance inductor Lb. At this time, energy in the inductor La passes through the main resonant ring LC, and forms a current via Kb to the ground. Energy is converted into a magnetic field through the primary resonance inductor L and transmitted outward. The above process is cycled.

In the above the single-control series resonance circuit embodiment, the resonance capacitor is connected between two terminals of the switch transistor. The resonance capacitor functions to absorb the resonant current, namely, a large pulse current at the two terminals of the switch transistor such that damage to the switch transistor can be presented. The resonance capacitor is also a part of the resonant ring in the single-control series resonance circuit.

The resonance capacitor is a part of the resonant ring, and has parameters strictly matching with the resonance transmitting coil.

A dotted arrow in the above figures indicates a transmission direction of energy generated by the resonance transmitting coil.

From a comparison between the above technical solutions and conventional technology, the full-bridge transmitting circuit driven by the single power source according to the embodiment of the present disclosure includes three resonant ring circuits, two switch transistors, and one driving power source. The first switch transistor is connected in parallel with a resonance capacitor of the first resonant ring circuit, the second switch transistor is connected in parallel with a resonance capacitor of the third resonant ring circuit, and the second resonant ring circuit is connected between a midpoint of the first resonant ring circuit and a midpoint of the third resonant ring circuit. It can be seen that the full-bridge transmitting circuit according the present disclosure uses only two switch transistors and one driving power source, having a simple circuit, a low cost and a superior performance.

It should be noted that the foregoing embodiments are written in a progressive manner, and the foregoing embodiments may refer to each other.

The above description of the embodiments herein enables those skilled in the art to implement or use the present disclosure. Numerous modifications to the embodiments are apparent to those skilled in the art, and the general principles defined herein can be implemented in other embodiments without deviating from the spirit or scope of the present disclosure. Therefore, the present disclosure is not limited to the embodiments described herein, but is to conform to the widest scope consistent with the principles and novel features disclosed herein.

The invention claimed is:

1. A complementary wireless power transmitter, comprising:
 a signal source, comprising N signal output terminals, wherein the signal source generates N signals respectively corresponding to the N signal output terminals, the N signals have a same frequency, a phase difference of the N signals is 360°/N, and N is a positive integer greater than or equal to 2 and less than or equal to 360; and
 N resonance transmitters, wherein an input terminal of each of the N resonance transmitters is connected to one of the N signal output terminals of the signal source, each of the N resonance transmitters comprises a resonance circuit, the resonance circuit comprises a resonance transmitting coil, a resonance capacitor, and a switch transistor, and an angle between planes at which the N resonance transmitting coils are located is a preset angle, and
 wherein one terminal of the resonance transmitting coil is connected to one terminal of the resonance capacitor, another terminal of the resonance transmitting coil is connected to a positive pole of a power source, and another terminal of the resonance capacitor is grounded, a control terminal of the switch transistor is connected to one of the N signal output terminals of the signal source, a first terminal of the switch transistor is connected to the one terminal of the resonance capacitor, and a second terminal of the switch transistor is connected to the other terminal of the resonance capacitor.

2. The complementary wireless power transmitter according to claim 1, wherein each of the N resonance transmitters comprises a drive amplifier, an input terminal of the drive amplifier is connected to one of the N signal output terminals of the signal source, and an output terminal of the drive amplifier is connected to the control terminal of the switch transistor.

3. The complementary wireless power transmitter according to claim 1, wherein a frequency of the N signals outputted by the signal source is the same as a resonant frequency of the resonance transmitting coil and the resonance capacitor.

4. The complementary wireless power transmitter according to claim 1, wherein a duty ratio of each of the N signals is less than 50%.

5. A full-bridge transmitting circuit driven by a single power source, applied for wireless power supply, comprising three resonant ring circuits, two switch transistors, and one driving power source, wherein
 the three resonant ring circuits are a first resonant ring circuits, a second resonant ring circuit, and a third resonant ring circuit, and the two switch transistors are a first switch transistor and a second switch transistor,
 the first switch transistor is connected in parallel with a resonance capacitor of the first resonant ring circuit, the second switch transistor is connected in parallel with a resonance capacitor of the third resonant ring circuit, and the second resonant ring circuit is connected between a midpoint of the first resonant ring circuit and a midpoint of the third resonant ring circuit,
 the first resonant ring circuit and the first switch transistor form a first single-control series resonance circuit, and the third resonant ring circuit and the second switch transistor form a second single-control series resonance circuit, each of the first single-control series resonance circuit and the second single-control series resonance circuit comprises a switch transistor, a resonance transmitting coil, and a resonance capacitor, and one terminal of the resonance transmitting coil is connected to one terminal of the resonance capacitor, another terminal of the resonance transmitting coil is connected to a positive pole of a power source, another terminal of the resonance capacitor is grounded, a first terminal of the switch transistor is connected to the one terminal of the resonance capacitor, and a second terminal of the switch transistor is connected to the other terminal of the resonance capacitor, wherein the second resonant ring circuit comprises a second resonance capacitor and a second resonance transmitting coil, and the second resonance capacitor and the second resonance transmitting coil are connected in parallel.

6. The full-bridge transmitting circuit driven by a single power source according to claim 5, wherein a frequency of a signal driving the first switch transistor and a frequency of a signal driving the second switch transistor are complementary.

* * * * *